United States Patent [19]

Miyagawa et al.

[11] Patent Number: 5,138,161
[45] Date of Patent: Aug. 11, 1992

[54] APPARATUS FOR READING RADIATION IMAGE INFORMATION

[75] Inventors: Ichirou Miyagawa; Hiromi Ishikawa, both of Kanagawa, Japan

[73] Assignee: Fuji Photo Film Co., Ltd., Kanagawa, Japan

[21] Appl. No.: 690,187

[22] Filed: Apr. 19, 1991

[30] Foreign Application Priority Data

| Apr. 20, 1990 | [JP] | Japan | 2-105868 |
| Apr. 20, 1990 | [JP] | Japan | 2-105869 |
| Apr. 20, 1990 | [JP] | Japan | 2-105870 |
| Aug. 3, 1990 | [JP] | Japan | 2-206051 |

[51] Int. Cl.$^5$ .............................. G03B 42/00
[52] U.S. Cl. ................................. 250/327.2
[58] Field of Search .............. 250/327.2 F, 327.2 E

[56] References Cited

U.S. PATENT DOCUMENTS

| 4,346,295 | 8/1982 | Tanaka et al. | 250/327.2 |
| 4,485,302 | 11/1984 | Tanaka et al. | 250/327.2 |
| 4,582,988 | 4/1986 | Aagano | 250/327.2 |
| 4,598,200 | 7/1986 | Taniguchi | 250/327.2 |
| 4,680,473 | 7/1987 | Matsuda et al. | 250/484.1 |
| 4,742,225 | 10/1988 | Chan | 250/327.2 |
| 4,818,880 | 4/1989 | Matsuda et al. | 250/327.2 |
| 4,824,194 | 4/1989 | Karasawa | 350/96.10 |
| 4,849,632 | 7/1989 | Watanabe | 250/327.2 |

Primary Examiner—Constantine Hannaher
Attorney, Agent, or Firm—Sughrue, Mion, Zinn, Macpeak & Seas

[57] ABSTRACT

The improved apparatus for reading radiation image information uses a scanning optical unit to scan excitation light two-dimensionally over the surface of a stimulable phosphor sheet having radiation image information stored and recorded therein, so that stimulated emission is produced in accordance with the recorded radiation image information and collected by means of a light collecting unit that is composed of a condenser mirror and an optical guide and that is located along and close to the main scanning of said excitation light, which stimulated emission is thereafter read photoelectrically with a photodetector. In order to insure that the flare produced from the phosphor sheet or the light collecting unit or by some other factors will not make a second entry into the phosphor sheet to produce undesirable stimulated emission, the apparatus includes at least one of the following means: a flare absorbing means that is located on the back side of the condenser mirror; a slit plate provided between the scanning optical unit and the light collecting unit; a flexible light-shielding member suspended upstream of the main scanning line; and a means that is provided on the exit face of the optical guide to prevent the flare from being reflected towards the entrance face of the optical guide. Because of this structural feature, the radiation image information read as an electric signal with the apparatus provides an image signal of good quality that has high contrast but low noise.

18 Claims, 9 Drawing Sheets

APPARATUS FOR READING RADIATION IMAGE INFORMATION

BACKGROUND OF THE INVENTION

1. Field of the Invention

This invention relates to an apparatus for reading radiation image information that is stored and recorded on a stimulable phosphor sheet.

2. Prior Art

Certain phosphors, when exposed to radiation such as X-rays, α-rays, β-rays, γ-rays, electron beams and ultraviolet rays, store part of the energy the radiation possesses, when the phosphor is subsequently exposed to excitation light such as visible light, it produces stimulated emission corresponding to the stored energy. The phosphor exhibiting such properties is known as a stimulable phosphor.

The assignee has proposed a system for recording and reproducing radiation image information using the stimulable phosphor. In the system, the radiation image information of an object such as the human body is first stored in a sheet having a layer of stimulable phosphor (which is hereinafter sometimes referred to simply as a "phosphor sheet") and the sheet is then scanned two-dimensionally with excitation light such as laser light to produce stimulated emission. The stimulated emission is read photoelectrically to obtain image signals, on the basis of which a radiation image of the object is produced as a visible image on a recording material such as a photographic material or a display device such as CRT (see, for example, Japanese Patent Application Kokai Nos. 55-12429 and 56-11395).

In this system for recording and reproducing radiation image information, the information of interest is read from the phosphor sheet in the following manner by means of various types of apparatus for reading radiation image information (which apparatus is hereinafter sometimes referred to simply as a "reading apparatus"). Excitation light of a given intensity that is emitted from a light source such as a He-Ne laser is reflected and deflected in the main scanning direction by means of a light deflector such as a galvanometer mirror and is passed through various optical elements including an fθ lens to illuminate the phosphor sheet. The phosphor sheet is transported by a transport means such as a belt conveyor or nip rollers in the sub-scanning direction, or a direction generally perpendicular to the main scanning direction. Thus, the excitation light deflected in the main scanning direction is capable of two dimensional "blanket" scanning of the phosphor sheet.

The area of the phosphor sheet that is illuminated with excitation light produces stimulated emission in accordance with the radiation image information stored and recorded in that area. The stimulated emission is incident on the entrance face of an optical guide either directly or after being reflected by a cylindrical condenser mirror that is located in a face-to-face relationship with that entrance face. The incident stimulated emission travels as guided by the optical guide and, after passing through a filter that cuts off light in the wavelength range of excitation light, the stimulated emission is launched into a photo multiplier where it is converted electric signals. After appropriate processing, the signals are reproduced as a visible image on a CRT or photographic material or recorded for storage in various recording media including optical disks One of the problems associated with this reading apparatus that reduce the precision of image reading is flare. While there are several types of flare including unwanted external light, the most significant in the reading apparatus is excitation light that is reflected or scattered after being incident on the phosphor sheet A as indicated by one-short-and-one-long dashed lines in FIG. 16. Part of this flare is reflected or scattered by the cylindrical condenser mirror 106 or the entrance face 104 of the optical guide 102 to make a second and direct entry into the phosphor sheet A. Another part of the flare denoted by 100a or 100b is further reflected or scattered by the entrance face 104 of the optical guide 102 or the cylindrical condenser mirror 106 to be incident again on the phosphor sheet A. Still another part which is denoted by 100c travels back in a direction generally opposite to the excitation light L (upward in the case shown in FIG. 16) to be reflected or scattered by the housing of the scanning optical unit or the optical elements in it, whereupon the flare is again incident on the phosphor sheet A. Whichever of these types of flare will excite the stimulable phosphor to produce stimulated emission.

The stimulated emission produced by this flare, as well as the stimulated emission produced by excitation light L will be launched into the optical guide 102 and transmitted therethrough to be read as image information However, it is very rare that the flare is incident on the image reading position (scanning line) 108, or the position identical to that of illumination with excitation light L. In other words, most of the stimulated emission produced by the flare comes from a different position than where the intended information should be read. As a consequence, the eventually read image will have a lower contrast, interfering with the reading of correct image information. Further, if the image of lower contrast is processed electrically, the image information associated with the flare will be amplified as noise, thereby making it impossible to reproduce a satisfactory visible image on a CRT or various kinds of recording materials.

In order to solve these problems, the assignee has proposed the following various reading apparatuses: an apparatus having a dichroic coating on the cylindrical reflecting face 110 of the cylindrical condenser mirror 106 that reflects stimulated emission but which does not reflect the excitation light (Japanese Patent Application Kokai No. 60-189736); an apparatus having a screen on the entrance face 104 of the optical guide 102 to prevent the reflection of excitation light (Japanese Patent Application Kokai No. 60-189737); an apparatus that has a filter provided between the scanning line 108 and the cylindrical condenser mirror 106 and/or the entrance face 104 of the optical guide 102, which filter absorbs excitation light but transmits stimulated emission (Japanese Patent Application Kokai No. 61-128239); an apparatus that is an improvement over the apparatuses disclosed in Japanese Patent Application Kokai Nos. 60-189736 and 60-189737 in that a single mirror having a dichroic coating is provided on the back side of the cylindrical condenser mirror so that the excitation light passing through the cylindrical condenser mirror is reflected by means of the added mirror towards the position in which the reading of image information from the phosphor sheet has ended, whereby the excitation light is also used as erasure light (Japanese Patent Application Kokai No. 61-65231).

The assignee also proposed in Japanese Patent Application Kokai No. 60-46166 and apparatus having a slit plate as shown by 112 in accompanying FIG. 17. The slit 112 is provided between the entrance face 104 of the optical guide 102 and the phosphor sheet A and has an aperture 114 of predetermined size corresponding to the scanning line 108. Flare reflected from the phosphor sheet A as typically denoted by 100d is blocked by the slit plate 112 and will not make reentry into the phosphor sheet A.

In the reading apparatuses described above, the flare that is reflected by either the cylindrical reflecting face 110 of the cylindrical condenser mirror 106 or the entrance face 104 of the optical guide 102 or both to be incident again on the phosphor sheet A can be substantially reduced to enable radiation image information to be read with much higher precision than the previous versions.

However, in the apparatus disclosed in Japanese Patent Application Kokai No. 60-189736, flare of small intensity can occur as a result of light transmission through the cylindrical reflecting face 110 and subsequent reflection by a support member for the cylindrical condenser mirror 106 (as indicated by dashed lines in FIG. 18) and this flare cannot be eliminated from the apparatus. In the apparatus disclosed in Japanese Patent Application Kokai No. 60-189737, the optical guide 102 is usually molded of plastic materials such as acrylic resins and this makes it difficult to provide a dichroic coating of high precision. Furthermore, flare cannot be totally eliminated from this apparatus. In the apparatus disclosed in Japanese Patent Application Kokai No. 61-128239, the need to provide a filter in the neighborhood of the scanning line lowers the degree of freedom in design. Further, the need to use the filter and an associated support member increases the complexity of the apparatus.

The apparatus disclosed in Japanese Patent Application Kokai No. 61-65231 has the problem that mounting a dichroic mirror at a specified angle of inclination on the back side of a dichroic cylindrical condenser mirror is extremely difficult to achieve while at the same time the degree of freedom in design is lowered. Further, it is difficult to insure that the flare incident on the cylindrical condenser mirror is directed exclusively towards the area of the phosphor sheet where information reading has ended. It is also difficult to achieve complete prevention of entrance into the optical guide of the stimulated emission produced by the flare. In order to meet these needs, still another member must be added but then the complexity of the apparatus is increased.

Under these circumstances, it has been desired to develop an apparatus for reading radiation image information that is capable of reducing the flare that originates from a cylindrical condenser mirror.

The conventional apparatuses described above have the additional problem that flare as typically denoted by 100c that travels back in a direction opposite to the excitation light and that is reflected by the housing of the scanning optical unit and associated optical elements to make a second entry into the stimulable phosphor sheet cannot be reduced. Hence, those apparatuses need a further improvement to reduce the flare of the type described above.

The apparatus disclosed in Japanese Patent Application Kokai No. 60-46166 has the light-shielding slit plate 112 disposed between the phosphor sheet A and each of the cylindrical condenser mirror 106 and the optical guide 102 as depicted in FIG. 17. The major problem with this apparatus is that in the presence of the slit plate 112, the stimulated emission that is supposed to be launched into the optical guide 102 is blocked as indicated by dashed lines in FIG. 17. This reduces the quantity of stimulated emission that is effectively launched into the optical guide 102, causing a substantial decrease in the efficiency of light collection. Another problem is that if the phosphor sheet A flexes, it will contact the slit plate 112, potentially causing unevenness in the speed of transport in the sub-scanning direction. If the flex of the phosphor sheet A is significant, even jamming can occur.

As shown in FIG. 16, part of the flare that is launched into the optical guide 102 through the entrance face 104 is reflected by an adhesive layer at the exit face of the optical guide 102 and emerges from the entrance face 104 to be reentrant into the phosphor sheet A. A side view of the light collecting unit in the reading system under consideration is shown schematically in FIG. 19. The optical guide 102 is formed of a plastic material such as an acrylic resin. The exit face 120 of the optical guide 102 is fitted with a color filter 124 for absorbing excitation light L, with a light-transmissive layer 122 being interposed. A photo multiplier 128 which serves as a photodetector is bonded to the color filter 124 with a light-transmissive adhesive layer 126 being interposed. Each of the optical guide 102 (stated more exactly, the material of which it is made) and the filter 124 has such a great difference in refractive index from the adhesive layer 122 that part of the flare that is launched into the optical guide 102 at the entrance face 104 to be guided through it together with the stimulated emission is reflected either at the interface between the adhesive layer 122 and the exit face 120 of the optical guide or at the interface between the adhesive layer 122 and the filter 124, whereupon the flare travels back in a direction opposite to that of incidence and emerges from the entrance face 104 to make a second entry into the phosphor sheet A, producing undesirable stimulated emission from the latter.

Hence, the conventional apparatuses described above have the yet another problem that they are incapable of eliminating the flare that is first launched into the optical guide 102 and which is then reflected at the interface between the adhesive layer 122 and each of the exit face 120 of the optical guide and the filter 124 to make a second entry into the phosphor sheet A. Under these circumstances, it has been desired to develop an apparatus for reading radiation image information that is further improved to reduce the adverse effects of flare of the kind described above.

BRIEF SUMMARY OF THE INVENTION

A first object, therefore, of the present invention is to provide an apparatus for reading radiation image information that enables the correct reading of image information by substantially reducing flare, in particular the flare that is reflected by a cylindrical condenser mirror to make another entry into a phosphor sheet either directly or after being reflected by other optical elements.

A second object of the present invention is to provide an apparatus for reading radiation image information that enables the correct reading of image information by substantially reducing flare, in particular the flare that travels back in a direction generally opposite to excitation light and that is reflected or scattered by members that are located in that direction (e.g. the housing of the scanning unit and optical elements disposed in it) to make another entry into a phosphor sheet.

A third object of the present invention is to provide an apparatus for reading radiation image information that substantially reduces the flare incident on a phosphor sheet in an area close to the scanning line of excitation light, that is free from problems such as a lower efficiency of the collection of stimulated emission, unevenness in the speed of transport in the sub-scanning direction and jamming, and that yet is simple in construction.

A fourth object of the present invention is to provide a apparatus for reading radiation image information that enables the correct reading of image information by substantially reducing flare, in particular the flare which, after being launched into an optical guide, is reflected at the interface between an adhesive layer and each of the exit face of the optical guide and a filter that are bonded by said adhesive layer, to make reentry into a phosphor sheet.

Another object of the present invention is to provide an apparatus that is capable of attaining simultaneously some of these objects by insuring that several types of flare that lower the precision of information reading are reduced simultaneously by a substantial amount.

The first object of the present invention can be attained by its first aspect which provides an apparatus for reading radiation image information comprising:
- a scanning optical unit for scanning excitation light over the surface of a stimulable phosphor sheet having radiation image information stored and recorded therein;
- an optical guide having an entrance face that is located in the vicinity of the main scanning line of said excitation light and that faces said scanning line, said optical guide receiving and transmitting the stimulated emission that is produced from said stimulable phosphor sheet in response to the scanning of said excitation light;
- a condenser mirror that is located in the vicinity of the main scanning line of said excitation light and that faces said scanning line, said condenser mirror reflecting the stimulated emission to be incident on the entrance face of said optical guide; and
- a photodetector with which the stimulated emission transmitted through said optical guide is read photoelectrically,
- the reflecting face of said condenser mirror being formed of a coating that reflects said stimulated emission but which transmits said excitation light, said coating being provided on its back side with a filter medium that is at least capable of absorbing said excitation light.

Preferably, said filter capable of absorbing the excitation light is a color filter or a light-absorbing filter.

Preferably, said filter capable of absorbing the excitation light is either the body material of said condenser mirror or a filter that is provided between said condenser mirror and its support member.

The second object of the present invention can be attained by its second aspect which provides an apparatus for reading radiation image information comprising:
- a scanning optical unit for scanning excitation light over the surface of a stimulable phosphor sheet having radiation image information stored and recorded therein;
- an optical guide having an entrance face that is located in the vicinity of the main scanning line of said excitation light and that faces said scanning line, said optical guide receiving and transmitting the stimulated emission that is produced from said stimulable phosphor sheet in response to the scanning of said excitation light;
- a condenser mirror that is located in the vicinity of the main scanning line of said excitation light and that faces said scanning line, said condenser mirror reflecting the stimulated emission to be incident on the entrance face of said optical guide;
- a photodetector with which the stimulated emission transmitted through said optical guide is read photoelectrically; and
- a slit plate that has a slit through which to pass said excitation light and that is located between said scanning optical unit and the light collecting unit composed of said optical guide and said condenser mirror in such a way as to cover the gap between the entrance face of said optical guide and the reflecting face of said condenser mirror.

Preferably, said slit plate is inclined at a predetermined angle so that the light scattered from said stimulable phosphor sheet is reflected toward areas other than said gap.

Preferably, said slit plate is formed of a material that absorbs the excitation light.

Preferably, said material that absorbs the excitation light is an acrylonitrile-styrene-butadiene (ABS) resin.

Preferably, said slit plate has a non-reflective coating on the side which faces said stimulable phosphor sheet.

Preferably, the surface of said slit plate on the side which faces said stimulable phosphor sheet is smooth enough to prevent the scattering of said excitation light.

Preferably, the reflecting face of said condenser mirror is formed of a material that reflects the stimulated emission and that transmits à least the excitation light.

Preferably, a filter medium that is at least capable of absorbing the excitation light is provided on the back side of said material of which the reflecting face of said condenser mirror is formed.

The third object of the present invention can be attained by its third aspect which provides an apparatus for reading image information comprising:
- a scanning optical unit for scanning excitation light over the surface of a stimulable phosphor sheet having radiation image information stored and recorded therein;
- an optical guide having an entrance face that is located in the vicinity of the main scanning line of said excitation light and that faces said scanning line, said optical guide receiving and transmitting the stimulated emission that is produced from said stimulable phosphor sheet in response to the scanning of said excitation light;
- a condenser mirror that is located in the vicinity of the main scanning line of said excitation light and that faces said scanning line, said condenser mirror reflecting the stimulated emission to be incident on the entrance face of said optical guide;
- a photodetector with which the stimulated emission transmitted through said optical guide is read photoelectrically;
- a means for transporting said stimulable phosphor sheet in a sub-scanning direction which is generally perpendicular to the main scanning direction of said excitation light; and a flexible light-shielding member that is suspended upstream of said main scanning line in the sub-scanning direction in which said stimulable phosphor sheet is transported.

Preferably, said light-shielding member is composed in such a way that its free end is positioned in the vicinity of the scanning line of excitation light when the stimulable phosphor sheet is transported in the slow scanning direction for reading radiation image information.

Preferably, said light-shielding member is suspended from said condenser mirror.

Preferably, said light-shielding member is suspended from said optical guide.

The fourth object of the present invention can be attained by an embodiment of its fourth aspect which provides an apparatus for reading radiation image information comprising:

- a scanning optical unit for scanning excitation light over the surface of a stimulable phosphor sheet having radiation image information stored and recorded therein;
- an optical guide having an entrance face that is located in the vicinity of the main scanning line of said excitation light and that faces said scanning line, said optical guide receiving and transmitting the stimulated emission that is produced from said stimulable phosphor sheet in response to the scanning of said excitation light;
- a condenser mirror that is located in the vicinity of the main scanning line of said excitation light and that faces said scanning line, said condenser mirror reflecting the stimulated emission to be incident on the entrance face of said optical guide;
- a photodetector with which the stimulated emission transmitted through said optical guide is read photoelectrically;
- a filter that absorbs said excitation light and that is provided between the exit face of said optical guide and said photodetector; and
- an adhesive layer that bonds said filter to the exit face of said optical guide, the refractive index difference between said adhesive layer and each of said optical guide and said filter being no more than 0.05.

The fourth object of the present invention can also be attained by another embodiment of its fourth aspect which provides an apparatus for reading radiation image information comprising:

- a scanning optical unit for scanning excitation light over the surface of a stimulable phosphor sheet having radiation image information stored and recorded therein;
- an optical guide having a wedge shaped exit face and an entrance face that is located in the vicinity of the main scanning line of said excitation light and that faces said scanning line, said optical guide receiving and transmitting the stimulated emission that is produced from said stimulable phosphor sheet in response to the scanning of said excitation light;
- a condenser mirror that is located in the vicinity of the main scanning line of said excitation light and that faces said scanning line, said condenser mirror reflecting the stimulated emission to be incident on the entrance face of said optical guide; and
- a photodetector with which the stimulated emission transmitted through said optical guide is read photoelectrically.

DETAILED DESCRIPTION OF THE INVENTION

The present invention is described below in greater detail.

To begin with, the apparatus for reading radiation image information according to the first aspect of the present invention is described in detail with reference to accompanying FIGS. 1–3.

This apparatus is constructed in the manner already described above. In particular, the cylindrical reflecting face of the cylindrical condenser mirror is formed of a cylindrical dichroic coat that transmits excitation light but which reflects stimulated emission in order to insure that the excitation light reflected or scattered after being incident on the stimulable phosphor sheet will not be reflected by the cylindrical condenser mirror, thereby preventing it from making reentry into the stimulable phosphor sheet either directly or via other optical members. If desired, a filter element that absorbs the excitation light is provided on the back side of the dichroic coat. Preferably, the body material of the cylindrical condenser mirror is made of a color filter element, or a filter that absorbs the excitation light is provided between the cylindrical condenser mirror and its support member.

Because of this arrangement, the apparatus for reading radiation image information in accordance with the first aspect of the present invention insures that the greater part of the flare that is incident on the cylindrical condenser mirror is not reflected by the dichroic coat at the reflecting face but instead is transmitted through the coat to be absorbed by the filter element located at the back side thereof. As a result, the flare will not make reentery into the stimulable phosphor sheet and no stimulated emission will be produced by that flare. Hence, using this apparatus, one is capable of reading correct radiative image information without involving any lower contrast or increased noise due to flare.

The apparatus for reading radiation image information according to the first aspect of the present invention is described below more specifically with reference to the preferred embodiments shown in attached FIGS. 1–3.

Figure 1:
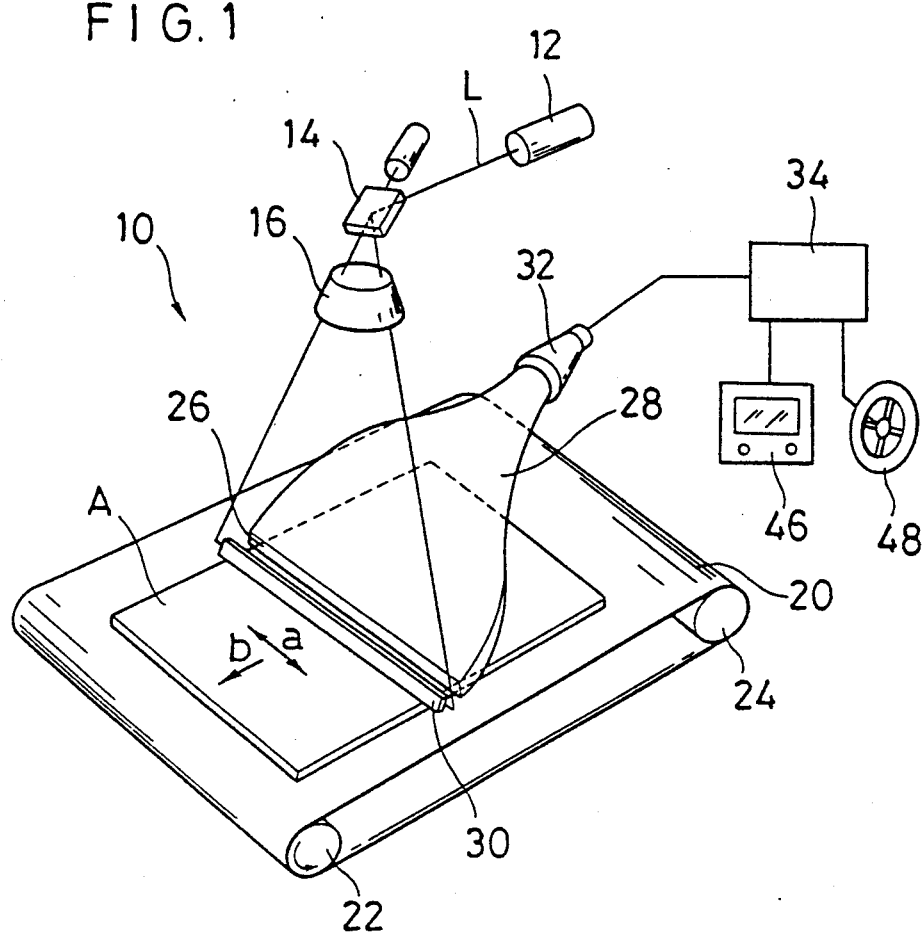
FIG. 1 is a schematic perspective view showing an example of the apparatus for reading radiation image information according to the first aspect of the present invention.

FIG. 1 is a schematic perspective view showing an embodiment of the apparatus according to the first aspect of the present invention. The reading apparatus generally indicated by 10 is such that the phosphor sheet A having radiation image information stored and recorded therein is scanned two-dimensionally by excitation light L to produce stimulated emission in accordance with the recorded image information. The stimulated emission is collected by a light collecting unit and measured photoelectrically to read the radiation image information from the phosphor sheet A. In the reading apparatus 10, the excitation light L is deflected by a scanning optical unit in the main scanning direction indicated by arrow a so as to scan the phosphor sheet A. The scanning optical unit is basically composed of a laser light source 12, a galvanometer mirror 14 and an fθ lens 16. These components are preferably assembled as an integral unit in a housing (not shown).

The excitation light L issuing from the laser light source 12 is incident on the galvanometer mirror 14. Depending on the stimulable phosphor of which the phosphor sheet A is made, various light sources including a He-Ne laser can be used as the laser light source 12. The excitation light L incident on the galvanometer mirror 14 is reflected and deflected so that it is bent down in the main scanning direction indicated by arrow a to be incident on the fθ lens 16, which focuses the excitation light L to converge at a predetermined position on the main scanning line 18 (see FIG. 2) for illuminating the phosphor sheet A. The light deflector used in the reading apparatus under discussion is by no means limited to the galvanometer mirror 14 shown in FIG. 1 and any other known light deflectors including a polygonal mirror and a resonant scanner may be used.

Needless to say, various types of optical units for compensating for tilting or various types of optical elements such as a mirror for changing the optical path may optionally be incorporated into the above-described optical unit for scanning excitation light L.

The phosphor sheet A is placed on a belt conveyor composed of an endless belt 20 and a pair of rollers 22 and 24 between which the endless belt is stretched. By means of this belt conveyor, the phosphor sheet A is transported in the sub-scanning direction (indicated by arrow a) which is generally perpendicular to the main scanning direction (indicated by arrow a). As it is transported in the sub-scanning direction, the entire surface of the phosphor sheet A is scanned two-dimensionally by the excitation light L deflected in the main scanning direction.

The area of the phosphor sheet A that is illuminated with the excitation light L produces stimulated emission in accordance with the radiation image information stored and recorded in that area. As shown in FIG. 2, the stimulated emission is launched into an optical guide 28 at the entrance face 26 either directly or after being reflected by a cylindrical condenser mirror 30. The optical guide 28 is disposed in such an attitude that its entrance face 26 is positioned in correspondence to the neighborhood of the main scanning line 18, and the cylindrical condenser mirror 30 is also disposed in a position that corresponds to the neighborhood of the main scanning line 18. The stimulated emission launched into the optical guide 28 is transmitted therethrough to be fed into a photo multiplier 32 where it is read photoelectrically. The result of the photoelectric reading is sent to an image processor unit. The optical guide 28 and the cylindrical condenser mirror 30 combine together to make up a light collecting unit.

Figure 2:
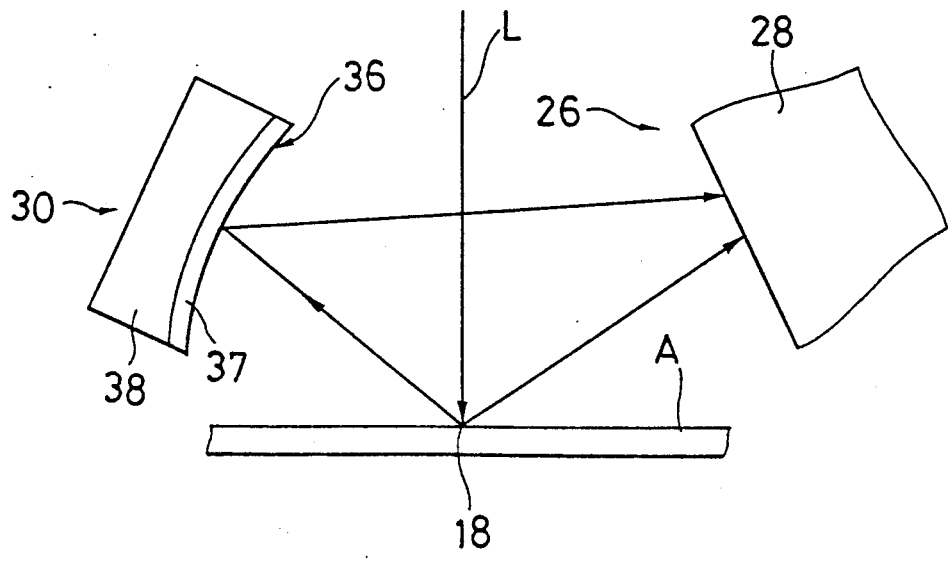
FIG. 2 is a diagram showing conceptually a preferred example of the area of the apparatus of FIG. 1 in the vicinity of the main scanning line.
Figure 3:
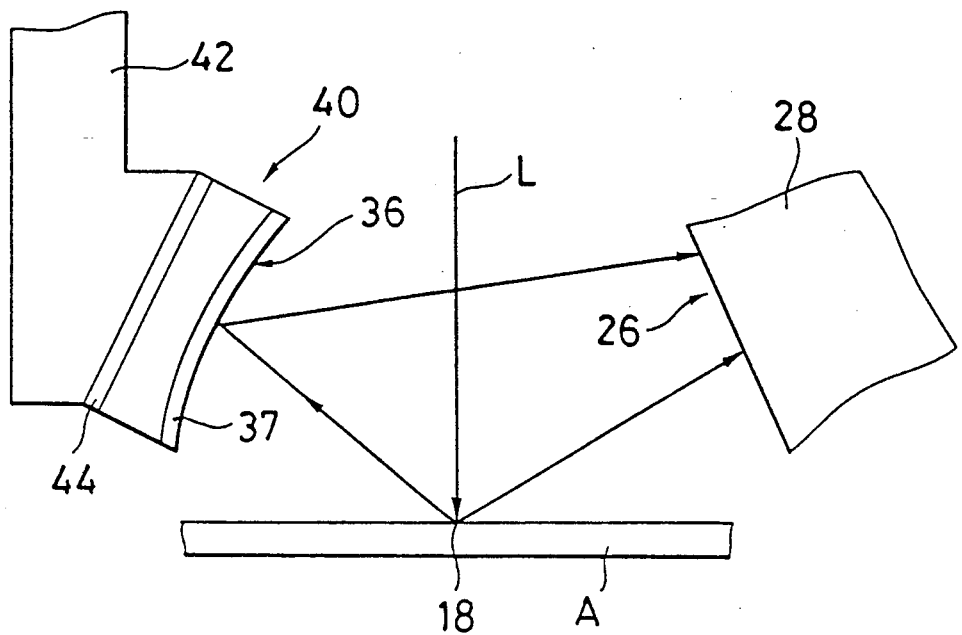
FIG. 3 is a diagram showing conceptually another preferred example of the area of the apparatus of FIG. 1 in the vicinity of the main scanning line.

FIG. 2 shows conceptually the area in the neighborhood of the main scanning line 18 of the excitation light L.

In order to insure that the flare which is the part of excitation light that is reflected or scattered after being incident on the phosphor sheet A will not make reentry into the phosphor sheet A to produce undesirable stimulated emission, the reading apparatus 10 shown in FIG. 1 is so designed that the cylindrical reflecting face 36 of the cylindrical condenser mirror 30 is formed of a dichroic coat 37 (see FIG. 2) that will reflect the stimulated emission while transmitting the excitation light L. In addition, the body material 38 of the cylindrical condenser mirror 30 is formed of a filter medium that absorbs the excitation light L.

With this arrangement, the greater part of flare that is incident on the cylindrical condenser mirror 30 is transmitted through the cylindrical reflecting face 36 without reflection. Further, the flare passing through the reflecting face 36 is absorbed by the body material 38 without making reentry into the phosphor sheet A by internal reflection as from the back side of the cylindrical condenser mirror 30 or at the interface between the cylindrical condenser mirror 30 and its support member (not shown). As a consequence, the reading apparatus 10 permits radiation image information to be read in a highly precise manner without suffering from significant errors due to flare.

The dichroic coat 37 at the reflecting face 36 which reflects the stimulated emission while transmitting excitation light L can be formed by various known methods. One method that can be employed comprises performing dichroic coating as by vacuum evaporation on the body material 38 typically made of glass. This method is equivalent to the application of a dichroic mirror.

In this invention, it is preferred that the condenser mirror is a cylindrical mirror having a cylindrical reflecting face shown in FIG. 2. However, the condenser mirror used in this invention is not limited to the cylindrical mirror, for example, a flat mirror having a flat reflecting face may be used.

In the reading apparatus 10 shown in FIG. 1, the body material 38 of the cylindrical condenser mirror 30 is to be formed of a filter medium that absorbs at least light in the wavelength range of excitation light L. Such filter media may be comprised of any known types of light-absorbing filters. If the excitation light L has a wavelength of 633 nm, color filters such as B410 and B390 (both being produced by HOYA Corp.) may be used. If desired, dyes, pigments and other materials that absorb the excitation light of interest may be mixed with (or impregnated in) glass, which is then used as the body material 38 of the cylindrical condenser mirror 30. A suitable type of such filter media (i.e., the dominant absorption wavelength of the filter media) may be selected in accordance with the excitation light L to be applied to the phosphor sheet A of interest.

In the example shown in FIG. 2, the body material 38 of the cylindrical condenser mirror 30 is composed of a filter medium so that a member made of the filter medium that absorbs excitation light L is disposed on the back side of the reflecting face 36 of the cylindrical condenser mirror 30. It should, however, be noted that this is not the sole case of the present invention and that various modifications can be adopted. For example, as shown in FIG. 3, a dichroic mirror that has a dichroic coat 37 at the cylindrical reflecting face 36 and the body material of which is composed of ordinary materials such as glass and plastics may be used as a cylindrical condenser mirror 40, with a filter 44 that absorbs excitation light L being provided between the cylindrical condenser mirror 40 and its support member 42. The filter 44 may be formed of any filter media such as a neutral density (ND) filter (product of Fuji Photo Film Co., Ltd.) that absorb at least light in the wavelength range of excitation light L. If desired, the color filters and light-absorbing filters already described above may be employed.

In a preferred embodiment, the entrance face 26 of the optical guide 28 may be provided with a film that prevents the reflection of excitation light L by transmitting the stimulated emission but absorbing the excitation light L. While such anti-reflection film is not limited to any particular type, evaporated thin films of $MgF_2$, $CaF_2$, cryolite, etc. may be mentioned as examples.

The stimulated emission that is launched into the optical guide 28 at the entrance face 26 travels upward by repeating total reflection within the optical guide 28 and, after the concomitant excitation light is cut off by a color filter (not shown), said emission is launched into the photo multiplier 32 where it is read photoelectrically. As already mentioned, the resulting electric image signal has a very small content of the stimulated emission due to flare and is an image signal of good quality that has high contrast but low noise.

This electric signal is sent to the image processor unit 34 where it undergoes appropriate signal processing to be either reproduced as a visible image on a display such as a CRT 46 or stored in an image recording medium 48 such as an optical disk.

As described above in detail, the apparatus for reading radiation image information according to the first aspect of the present invention insures that most of the flare incident on the cylindrical condenser mirror during image reading is transmitted through the reflecting face of the mirror without reflection and is further absorbed by the filter provided on the back side of that reflecting face. Therefore, the flare will not make reentry into the stimulable phosphor sheet to produce undesirable stimulated emission.

Thus, according to the apparatus of the first aspect of the present invention, correct radiation image information can be read without involving any lower contrast or increased noise due to flare.

The apparatus for reading radiation image information according to the second aspect of the present invention is now described below in detail with reference to accompanying FIGS. 4–7.

This apparatus is constructed in the manner already described above and insures that flare, in particular the flare that travels back in a direction generally opposite to the excitation light will not be reflected or scattered by the housing of the scanning optical unit or associated optical elements to make reentry into the stimulable phosphor sheet.

In a first preferred example of this second aspect of the present invention, a slit plate is provided between the light collecting unit and the scanning optical unit at a predetermined angle that will not cause the flare to be reflected toward the gap between the optical guide and the cylindrical condenser mirror. In the presence of this slit plate, the flare will be reflected in an entirely different direction than when it is incident. Furthermore, even if the reflected flare should make reentry into the stimulable phosphor sheet, the position of its incidence is sufficiently remote from the light collecting unit to prevent the resulting stimulated emission from being launched into the optical guide.

More preferably, the slit plate is formed a light-absorbing member that is smooth on the surface that faces the stimulable phosphor sheet. The advantage of this construction is that even if the flare travels back in a substantially opposite direction to the excitation light, most of it is absorbed by the slit plate and will not make reentry into the stimulable phosphor sheet.

In a second preferred example of the second aspect of the present invention, a slit plate is provided between the light collecting unit and the scanning optical unit, which slit plate is made of a light-absorbing material that has a non-reflective coat on the side that faces the stimulable phosphor sheet. The advantage of this construction is that even if the flare travels back in a substantially opposite direction to the excitation light, it is effectively absorbed by the slit plate without reflection and will not make reentry into the stimulable phosphor sheet.

Thus, according to the apparatus of the second aspect of the present invention, correct radiation image information can also be read without involving any lower contrast or increased noise due to flare.

The apparatus for reading radiation image information according to the second aspect of the present invention is described below more specifically with reference to the preferred embodiments shown in accompanying FIGS. 4–7.

Figure 4:
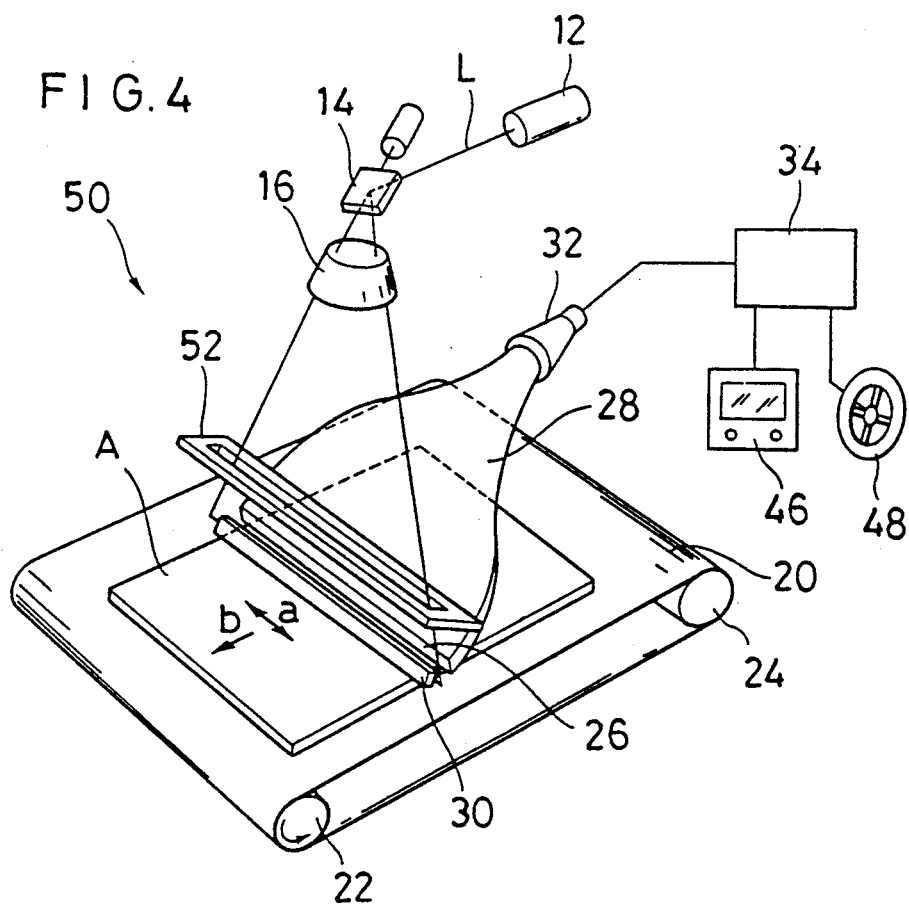
FIG. 4 is a schematic perspective view showing an example of the apparatus for reading radiation image information according to the second aspect of the present invention.

FIG. 4 is a schematic perspective view showing an example of the reading apparatus according to the second aspect of the present invention. The reading apparatus generally indicated by 50 in FIG. 4 is identical to the apparatus 10 shown in FIG. 1 except for the construction of the cylindrical condenser mirror 30 and the slit plate 52. Thus, the components that are the same as those of the apparatus 10 are identified by like numerals and will not be described in detail.

As shown in FIG. 4, a slit plate 52 which is the most characteristic part of the apparatus 50 is provided below the scanning optical unit composed of the laser light source 12, the galvanometer mirror 14 and the fθ lens 16. Excitation light L issuing from the laser light source 12 passes through a slit 54 (see FIG. 5) in the slit plate 52 to be incident on the phosphor sheet A. As already mentioned, the area of the phosphor sheet A that is illuminated with the incident excitation light L produces stimulated emission which is collected by the optical guide 28 and the cylindrical condenser mirror 30 to be launched into the photo multiplier 32 where it is read photoelectrically to produce an electric signal that is subsequently processed with the image processor unit 34.

As already mentioned in connection with the prior art, one of the factors that reduces the precision of image reading with apparatuses of the type contemplated by the present invention is the flare that makes reentry into the phosphor sheet A after reflection or scattering to produce undesirable stimulated emission, which is read as noise in addition to the stimulated emission produced from the predetermined image reading position.

Figure 5:
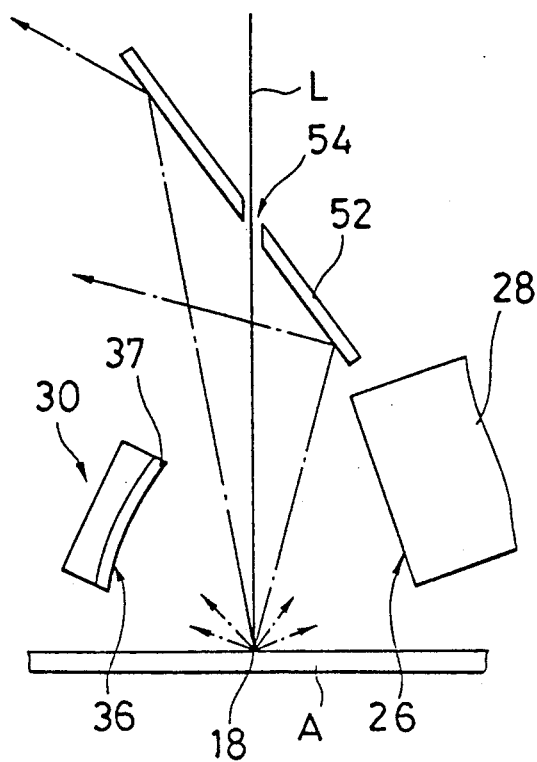
FIG. 5 is a diagram showing conceptually a preferred example of the area of the apparatus of FIG. 4 in the vicinity of the main scanning line.
Figure 6:
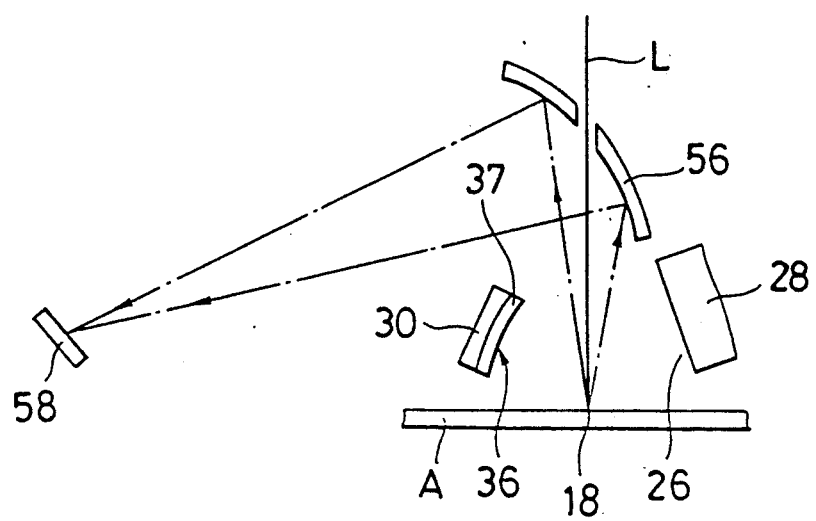
FIG. 6 is a diagram showing conceptually another preferred example of the area of the apparatus of FIG. 4 in the vicinity of the main scanning line.
Figure 16:
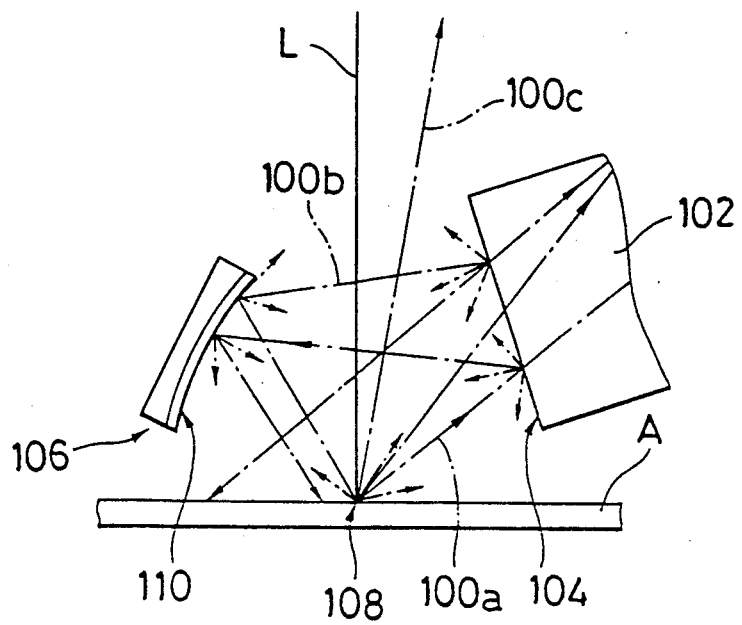
FIG. 16, 17 and 18 are diagrams showing conceptually the area in the vicinity of the main scanning line of three conventional apparatuses for reading radiation image information.
Figure 17:
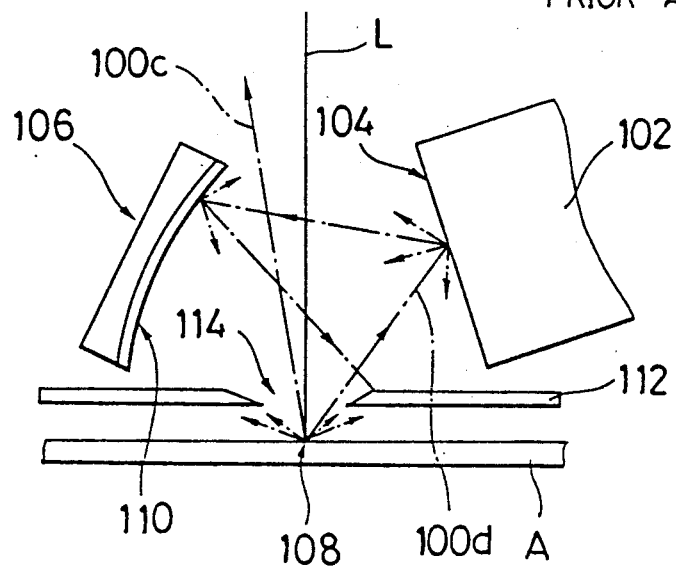
Figure 18:
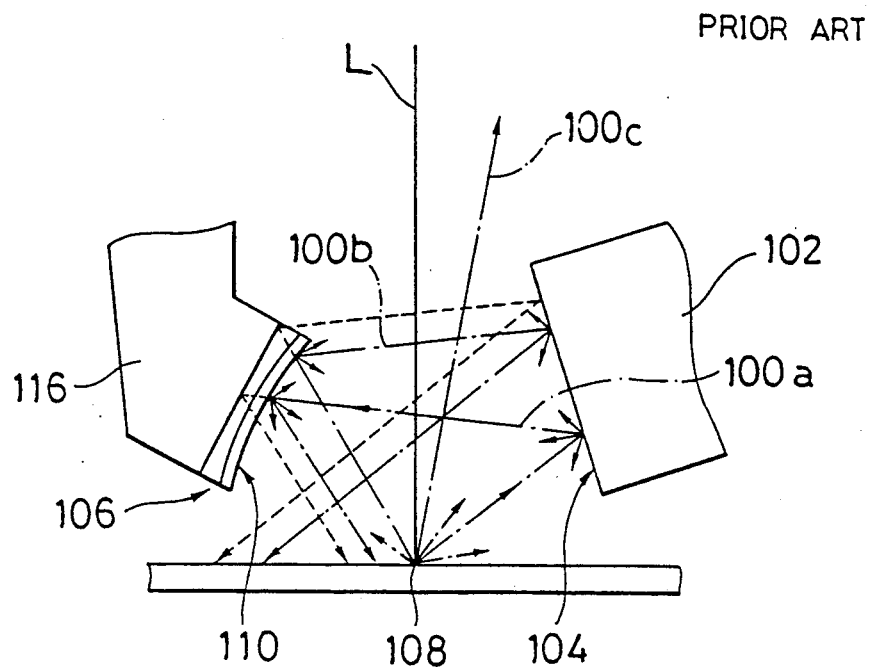
Figure 19:
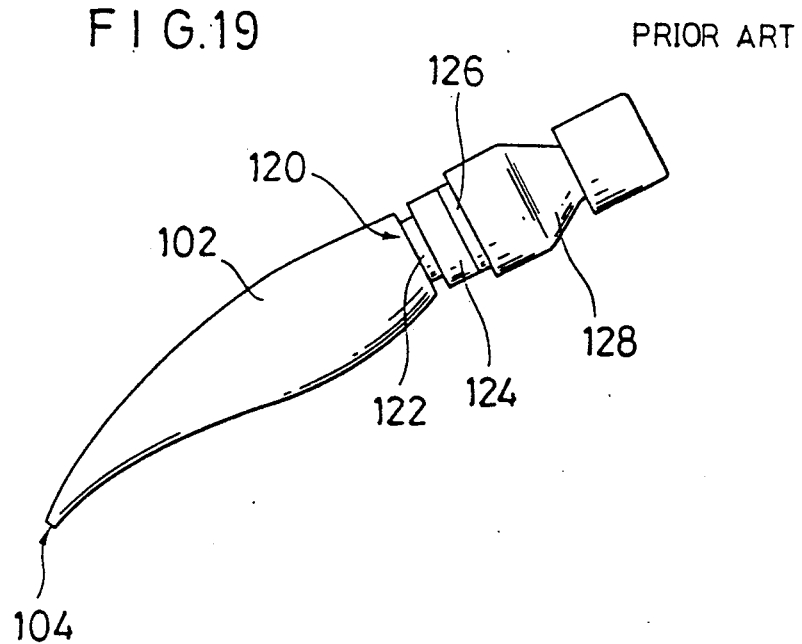
FIG. 19 is a schematic side view of the light collecting unit to be used in the conventional apparatuses for reading radiation image information.

As shown in FIG. 5, the reading apparatus 50 according to the first preferred embodiment of the second aspect under consideration is characterized by the slit plate 52 which is provided between the scanning optical unit (or its housing) and the light collecting unit composed of the optical guide 28 and the cylindrical condenser mirror 30. This slit plate 52 prevents the deterioration in the precision of information reading which would otherwise occur if flare, particularly the flare indicated by 100c in FIGS. 16–18 which is scattered on a substantially opposite direction (upward in FIG. 5) to the excitation light, made reentry into the phosphor sheet A.

In a more preferred embodiment which is intended to prevent the flare-induced deterioration in the precision of image reading in a more effective manner, the cylindrical condenser mirror 30 is in the form of a dichroic mirror having on its reflecting face 36 a dichroic coat 37 that reflects stimulated emission but which transmits the excitation light L. If desired, the body material of the cylindrical condenser mirror 30 or the adhesive layer between the body material and the mirror supporting member may formed of a filter medium that absorbs the excitation light as in the first aspect of the present invention.

The slit plate 52 has the slit 54 having a longitudinal axis in the main scanning direction of excitation light L which is to pass through that slit. Preferably, the slit plate 52 is formed of a member capable of absorbing the excitation light that is smooth on the surface that faces the phosphor sheet A. The slit plate 52 is positioned between the light-collecting unit and the scanning optical unit at such an angle that the flare reflected by the surface of the slit plate will not be incident again on the phosphor sheet A in the area close to the scanning line, more specifically in the gap between the entrance face 26 of the optical guide 28 and the cylindrical condenser mirror 30 (which gap is hereunder referred to as the "gap of the light collecting unit").

Light incident on the surface of ordinary planar objects will necessarily undergo surface reflection to some extent, and this is true even if the surface is made of a light-absorbing material. Under the circumstances, the slit plate 52 is positioned in the first preferred embodiment of the second aspect under consideration at such a predetermined angle that the flare undergoing surface reflection by the slit plate 52 (as indicated by one-long-and-one-short dashed lines in FIG. 5) will not make reentry into the gap of the light-collecting unit. As a result, the stimulated emission produced by the reflected flare will not be admitted into the optical guide 28, thereby enabling the desired image to be read in a more correct way.

The angle of inclination of the slit plate 52 will vary with the type of the reading unit 50 or the position of installation of that plate and an appropriate value may be selected so as to satisfy the aforementioned condition in accordance with these parameters. The position of the slit plate 52 may also be determined by properly adjusting the relative position of the scanning optical unit (or its housing) and the light collecting unit in accordance with the type of the reading unit 50.

Preferably, the slit plate 52 is formed of a material capable of absorbing excitation light that is smooth on the surface (the lower surface as viewed in FIG. 5) that faces the phosphor sheet A. The term "smooth" as used herein means that the surface of interest is smooth enough to avoid the scattering of incident light even if it is reflected by that surface. With this structural feature, the flare reflected by the lower surface of the slit plate 52 will not undergo random reflection and can reliably be directed to areas other than the gap of the light collecting unit. The light-absorbing member may be in any form and advantageous examples include a black light-shielding plate and a color filter that absorbs excitation light.

Materials that satisfy the condition described above and which is suitable for use in the slit plate 52 may be exemplified by a black ABS resin, a color filter medium that the excitation light and a light-absorbing filter. If the excitation light L emits at 633 nm, the color filter medium may be exemplified by B390 and B410 (both being produced by Hoya Corp.)

According to the construction described above, practically all part of the flare that travels upward to be incident on the slit plate 52 is absorbed by the latter. Further, the flare reflected from the slit plate 52 will not be admitted into the gap of the light collecting unit. Consequently, desired image information can be read with high precision without suffering from any adverse effects of the flare.

The construction of the reading apparatus according to the first preferred embodiment of the second aspect of the present invention is in no way limited to the foregoing example and various modifications may be adopted. For instance, a cylindrical slit plate 56 (see FIG. 6) may be combined with a member 58 capable of absorbing excitation light that is located in a position close to the focal point of the cylindrical plate. With this arrangement, the flare reflected by the slit plate 56 is allowed to be incident on the light-absorbing member 58 so that it is absorbed by said member.

Figure 7:
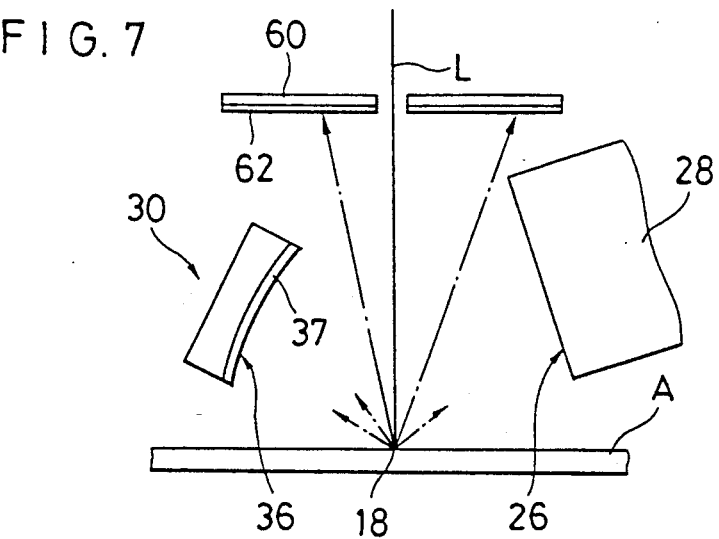
FIG. 7 is a diagram showing conceptually still another preferred example of the area of the apparatus of FIG. 4 in the vicinity of the main scanning line.

FIG. 7 illustrates conceptually the area of the reading apparatus in the vicinity of the main scanning line 18 according to a second preferred embodiment of the second aspect of the present invention. This second preferred embodiment is essentially the same as the already described first preferred embodiment except for the slit plate. In the first preferred embodiment, the slit plate 52 is formed of a member capable of absorbing excitation light that is smooth on the surface that faces the phosphor sheet A and this plate is positioned at an angle that satisfies the aforementioned condition. On the other hand, the slit plate 60 shown in FIG. 7 is formed of a member capable of absorbing excitation light that has a non-reflective coat 62 at least on the side where it faces the phosphor sheet A.

With this construction, the slit plate 60 does not cause any surface reflection of the flare and instead is capable of absorbing it almost completely. Hence, the slit plate 60 need not be inclined as in the first preferred embodiment and as long as the flare reflected by the scanning optical unit can be prevented from making reentry into the gap of the light collecting unit, the slit plate 60 may be positioned parallel to the phosphor sheet A or it may be disposed at any angle in any position depending upon the type of the reading unit.

The method of forming the non-reflective coat 74 is not limited in any particular way and various known techniques can be employed, such as evaporating a plurality of thin films having different refractive indices.

The stimulated emission that is launched into the optical guide 28 at the entrance face 26 travels upward by repeating total reflection within the optical guide 28 and, after the concomitant excitation light is cut off by a color filter (not shown), said emission is launched into the photo multiplier 32 where it is read photoelectrically. As already mentioned, the resulting electric image signal has a very small content of the stimulated emission due to flare and is an image signal of good quality that has high contrast but low noise.

As described above in detail, the apparatus for reading radiation image information according to the second aspect of the present invention uses a slit plate that reflects or absorbs the flare that has occurred during information reading and that afterward travels in a substantially opposite direction to the excitation light. In the first preferred embodiment of this second aspect, the flare is reflected by a slit plate that is inclined at a predetermined angle to insure that the flare having undergone surface reflection is directed towards areas that are remote from the main scanning line of the excitation light. More preferably, the slit plate is formed of a member capable of absorbing excitation light that has a smooth surface on the side that faces the phosphor sheet. In the second preferred embodiment of the second aspect, the flare is absorbed by a slit plate that is formed of a member capable of absorbing excitation light that has a non reflective coat at least on the side where it faces the phosphor sheet. Because of these constructions, the flare traveling back in a substantially opposite direction to the excitation light in the reading apparatus according to the second aspect of the present invention will not make reentry into the stimulable phosphor sheet through the gap of the light the collecting unit to produce undesirable stimulated emission.

Thus, according to reading apparatus of the second aspect of the present invention, correct radiation image information can be read without involving any lower contrast or increased noise due to flare.

The apparatus for reading radiation image information according to the third aspect of the present invention is next described in detail with reference to accompanying FIGS. 1 and 8. This apparatus is characterized in that the stimulable phosphor sheet being transported in the sub-scanning direction during information reading is covered with a flexible light-shielding member in an area close to the main scanning line. The light-shielding member blocks any flare that will otherwise be incident on the stimulable phosphor sheet and this contributes to a substantial reduction in the flare that can potentially be incident in the area close to the main scanning line of the sheet.

Preferably, the light-shielding member is constructed in such a way that its free end makes contact with the phosphor sheet as the latter is transported in the sub-scanning direction. Thus, unlike in the prior art reading apparatus using an ordinary slit plate, this member will not interfere with the entrance of stimulated emission into the optical guide and desired radiation image information can be read while preventing the deterioration in the precision of information reading due to flare and yet without lowering the efficiency of light collection.

Further, the light-shielding member is flexible and free from the problems of jamming and uneven transport in the sub-scanning direction which would otherwise occur in the prior art apparatus on account of contact between the slit plate and the flexing stimulable phosphor sheet.

Because of these structural features, the reading apparatus according to the third aspect of the present invention insures the phosphor sheet to be transported in the sub-scanning direction in a consistent way, whereby correct radiation image information can be read without involving any lower contrast or increased noise due to flare.

The apparatus for reading radiation image information according to the third aspect of the present invention is described below more specifically with reference to the preferred embodiments shown in accompanying FIGS. 1 and 8.

Figure 8:
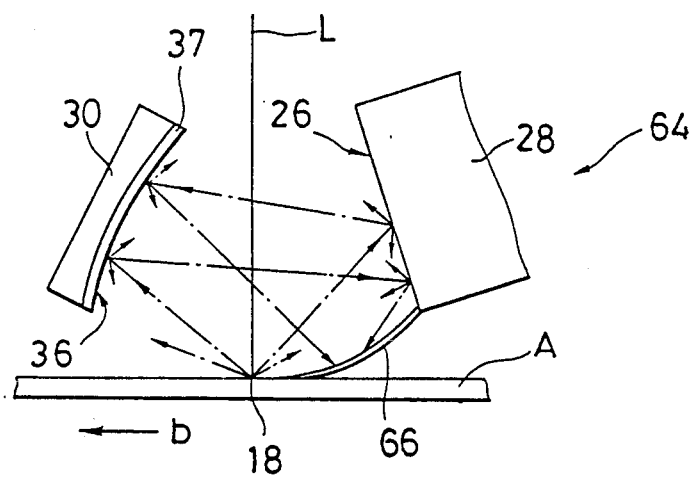
FIG. 8 is a diagram showing conceptually a preferred example of the area in the vicinity of the main scanning line of apparatus for reading radiation image information according to the third aspect of the present invention.

FIG. 8 is a diagram that shows conceptually the area of phosphor sheet A which is in the vicinity of the main scanning line 18 of excitation light L. The reading apparatus generally indicated by 64 in FIG. 8 is identical to the apparatus 10 shown in FIG. 1 except for the construction of the cylindrical condenser mirror 30 and a light-shielding screen 66. Thus, the general layout of the apparatus is neither depicted nor described and, instead, only the characterizing feature of the apparatus is described below with reference to FIG. 8.

As already mentioned in connection with the prior art, one of the factors that reduces the precision of image reading with apparatuses of the type contemplated by the present invention is the flare that makes reentry into the phosphor sheet A after reflection or scattering to produce undesirable stimulated emission, which is read as noise in addition to the stimulated emission produced from the predetermined image reading position.

In the reading apparatus 64 shown in FIG. 8, the light-shielding screen 66 is suspended from the lower end of the optical guide 28 in order to insure that the flare described above will not make reentry into the phosphor sheet A to produce undesirable stimulated emission. The screen 66 merely hangs at the lower end of the optical guide 28 and has a sufficient length to insure that its free end will remain in contact with the phosphor sheet A during image reading. Hence, as FIG. 8 shows, the free end of the screen 66 is stretched to cover the phosphor sheet A when it is transported in the sub-scanning direction (indicated by arrow b) during image reading.

Accordingly, the greater part of the flare that would otherwise be incident on the phosphor sheet A (as indicated by one-short and one long-dashed lines in FIG. 8) can be blocked by the screen 66 and, as a result, the undesirable stimulated emission produced by the flare can be sufficiently reduced to achieve a substantial decrease in reading errors. Furthermore, unlike in the case of providing a slit plate between the entrance face 26 of the optical guide 28 and the phosphor sheet A, the screen 66 does not interfere with the incidence of the stimulated emission on the entrance face 26, nor does it cause troubles such as jamming and unevenness in the transport of the phosphor sheet A in the sub-scanning direction that would otherwise occur on account of its contact with the slit plate.

The dimensions such as thickness of the light-shielding screen 66 may be set at any suitable values in accordance with the type of the reading apparatus 64 as long as the screen maintains satisfactory light-shielding and flexible properties. It should, however, be noted that in order to insure that the entrance of the flare into the phosphor sheet A is definitely prevented, the length of the light-shielding screen 66 in the main scanning direction of excitation light (as indicated by arrow a) is preferably not smaller than the scan width of the excitation light whereas the length of the screen 66 in the sub-scanning direction is preferably sufficient to cover areas of the phosphor sheet A that are the closest to the main scanning line 18 during image reading.

The light-shielding screen 66 may be of any known type selected from among light-shielding flexible members that will not potentially damage the surface of the phosphor sheet and an advantageous example of such members is a light-shielding conductive film. Light-shielding conductive films are particularly advantageous since they will not electrically charge the surface of the phosphor sheet A even if it is contacted by those films as it is transported in the sub-scanning direction.

The flexible light-shielding member that can be used in the third aspect of the present invention is in no way limited to the light-shielding screen 66 and any other known flexible light-shielding members including a light-shielding brush can be employed without limitation.

In FIG. 8, the light-shielding member such as the light-shielding screen 66 is suspended from the lower end of the optical guide 28. It may be disposed at any other position that is upstream of the scanning line 18 and that will not interfere with the scanning of the excitation light L or the incidence of the stimulated emission on the entrance face 26 of the optical guide 28. For instance, the screen 66 may be mounted on the cylindrical condenser mirror 30 if the sub-scanning direction is opposite the direction indicated by arrow b. If desired, the light-shielding member may be provided with the aid of various types of support members.

In the third aspect of the present invention, the area of the phosphor sheet A that is covered with the light-shielding member is limited to the "pre-reading" area, or the area upstream of the scanning line 18. However, if the excitation light L has high intensity, the quantity of stimulated emission that is produced by a second excitation following the reading of image information is about 10 times as small as the quantity of stimulated emission produced by the first excitation. Therefore, the deterioration in the precision of image reading can be prevented with a very high efficiency by merely insuring that the flare will not be admitted into the "pre-reading" area as in the third aspect of the present invention.

Having the construction described above, the reading apparatus 64 according to the third aspect of the present invention is capable of preventing the flare-induced deterioration in the precision of image reading without lowering the efficiency of collecting the stimulated emission from the phosphor sheet. It is particularly preferred with the reading apparatus 64 that the angle and position of installation of the optical guide 28 and the cylindrical condenser mirror 30 are properly adjusted to insure that as much flare as possible is directed towards the light-shielding screen 66 (light-shielding member).

Further, in order to reduce the adverse effects of the flare in a more advantageous way, the reflecting face 36 of the cylindrical condenser mirror 30 may by provided with a cylindrical dichroic coat 37 so that the incident excitation light is transmitted whereas the stimulated emission is reflected by that coat. Alternatively, the body material of the cylindrical condenser mirror 30 or the adhesive layer between the body material and the mirror support member may be formed of a filter medium that absorbs the excitation light as in the first aspect of the present invention. It is also preferred that the entrance face 26 of the optical guide 28 is so constructed as to lower the reflectance of the excitation light.

If necessary, further reduction in the flare can be accomplished by providing the reading apparatus 64 with a slit plate of the type denoted by 52, 56 or 60 in the second aspect of the present invention.

In short, the reading apparatus according to the third aspect of the present invention which has the construction described on the foregoing pages uses a flexible light-shielding member such as a light-shielding screen to eliminate flare that would otherwise occur in areas near the main scanning line of the excitation light and this prevents the flare from being incident on the stimulable phosphor sheet without causing a substantial decrease in the efficiency of collecting the stimulated emission from the phosphor sheet.

Further, unlike the prior art apparatus which provides an ordinary slit plate between the stimulable phosphor sheet and the entrance face of the optical guide, the reading apparatus according to the third aspect of the present invention can be operated without causing troubles such as jamming and uneven transport of the phosphor sheet in the sub-scanning direction even if it is flexing.

Thus, according to the third aspect of the present invention, correct radiation image information that does not involve any lower contrast or increased noise due to flare can be read with satisfactory efficiency without experiencing such flare-induced troubles as jamming and uneven transport of the phosphor sheet in the sub-scanning direction.

The apparatus for reading radiation image information according to the fourth aspect of the present invention is now described below in detail with reference to accompanying FIGS. 1 and 9–15. In the reading apparatus according to a first preferred embodiment of the fourth aspect, each of the optical guide and the filter for absorbing excitation light has a refractive index that differs by no more than 0.05, preferably no more than 0.03, from the refractive index of the adhesive layer that bonds the optical guide and the filter. Because of this refractive index difference, the flare admitted into the optical guide will not be reflected at the interface between its exit face and the adhesive layer or at the interface between the filter and the adhesive layer. Instead, the flare will positively pass through the adhesive layer to be admitted into the filter where it is sufficiently absorbed to make no second entry into the stimulable phosphor sheet.

In the reading apparatus according to a second preferred embodiment of the fourth aspect, the exit face of the optical guide is wedge shaped. The advantage of this embodiment is that even if the flare admitted into the optical guide makes reflections at the interface between the adhesive layer and the exit face of the optical guide or the filter, the angle of reflection does not satisfy the critical condition for total reflection and hence will not make reentry into the stimulable phosphor sheet as in the first preferred embodiment.

Thus, according to the apparatus of the fourth aspect of the present invention, correct radiation image information can be read without involving any lower contrast or increased noise to due flare.

The apparatus for reading radiation image information according to the fourth aspect of the present invention is described below more specifically with reference to the preferred embodiments shown in FIGS. 9–15.

This apparatus is identical to the reading apparatus 10 shown in FIG. 1 except for the construction of the cylindrical condenser mirror 30 and the layout between the optical guide 28 and the photo multiplier 32. Thus, the general layout of the apparatus is neither depicted nor described and, instead, only the light collecting unit of the apparatus is described below with reference to FIGS. 9–15.

As already mentioned hereinabove, the prior art reading apparatus has had the problem that flare makes reentry into the phosphor sheet A after reflection or scattering to produce undesirable stimulated emission, which is read as noise in addition to the stimulated emission produced from the predetermined image reading position.

To prevent this problem, the reading apparatus 10 according to the first preferred embodiment of the fourth aspect of the present invention is so designed that each of the optical guide 28 and the filter for absorbing excitation light has a refractive index that differs by no more than 0.05 from the refractive index of the adhesive layer which bonds the two members together, and in the reading apparatus according to the second preferred embodiment of the fourth aspect, the exit face of the optical guide 28 is shaped like a wedge. Either design is effective in preventing the flare, particularly the flare that is admitted into the optical guide 28, from being reflected at the interface between the exit face of the optical guide and the adhesive layer to make reentry into the phosphor sheet A.

Figure 9:
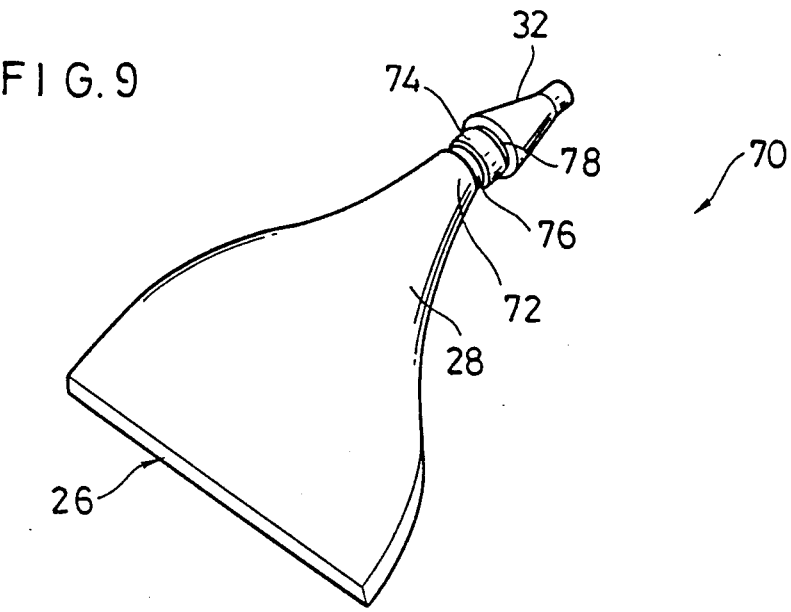
FIG. 9 is a schematic perspective view showing a preferred example of the light collecting unit to be used in the fourth aspect of the present invention.

FIG. 9 is a schematic perspective view that shows an example of the assembly 70 of optical guide and photodetector according to the first preferred embodiment of the fourth aspect of the present invention as it is applied to the reading apparatus 10 shown in FIG. 1.

The optical guide 28 is made of a light-transmissive material such as an acrylic resin. A typical method for fabricating this optical guide comprises heating or otherwise processing a sheet of light-transmissive resin to produce such a shape that the entrance face 26 extends parallel to and in correspondence with the main scanning line whereas it is rounded towards the exit face 72 to conform to the light-receiving face of the photo multiplier 32. Details of the optical guide fabricated by this method are given in commonly assigned Japanese Patent Application Kokai No. 55-87970.

In order to reduce any adverse effects that would be caused by reflection from the entrance face 26 of the optical guide 28, said entrance face is so designed that it will have a lower reflectance of incident excitation light. The exit face 72 of the optical guide is fitted with the filter 74 for absorbing the excitation light L admitted into the optical guide 28 and the two members are bonded together by means of an adhesive layer 76. The light-receiving face of the photo multiplier 32 is also bonded to the filter 74 via an adhesive layer 78.

The filter 74 may be formed of any filter medium that absorbs the excitation light L incident on the phosphor sheet A and an appropriate filter medium may be selected in accordance with the wavelengths of the excitation light L and the resulting stimulated emission. To take, for example, the case where the excitation light L emits at 633 nm to produce stimulated emission at 400–390 nm, color filters such as B410 and B390 (both being produced by Hoya Corp.) are used advantageously. The photo multiplier 32 also is not limited to any particular type and any known versions may be employed.

In the first preferred embodiment of the fourth aspect of the present invention, each of the optical guide 28 and the filter 74 is designed to have a refractive index that differs by no more than 0.05, preferably no more than 0.03, from the refractive index of the adhesive layer 76. Consider, for example, the case where the optical guide 28 is made of an acrylic resin having a refractive index (n) of 1.492 and the filter 74 is a color filter having a refractive index (n) of 1.524 (e.g. B390 of Hoya Corp.); in this case, the adhesive layer 76 should have a refractive index (n) of 1.474–1.542.

With this refractive index difference, the flare admitted into the optical guide 28 will not be reflected at the interface between the adhesive layer 76 and the exit face 72 of the optical guide 28 or the filter 74. Instead, almost all of the flare is admitted into the filter 74 where it is effectively absorbed and will not make a second entry into the phosphor sheet A to produce undesirable stimulated emission.

The adhesive layer 76 may be made of any known light-transmissive adhesive that is capable of bonding the optical guide 28 and the filter 74 that satisfies the refractive index condition set forth above and that yet will not interfere with the effective admission of the stimulated emission into the photo multiplier 32. If, as in the case described above, the optical guide 28 is made of an acrylic resin having a refractive index (n) of 1.492 whereas the filter 74 is a color filter having a refractive index (n) of 1.524 (e.g. B390 of Hoya Corp.), a UV curable adhesive with n =1.499 (i.e., 3080 of Three Bond, K.K.) may be used to form the adhesive layer 76.

In the second preferred embodiment of the fourth aspect of the present invention, the exit face of the optical guide is shaped like a wedge. The structural features of this embodiment are essentially the same as the first embodiment except that the exit face of the optical guide 28 has a different shape and that there is no limitation on the refractive index of the adhesive layer 76. Hence, the same components are identified by like numerals and will not be described in detail. The adhesive layer 76 for use in the second embodiment may be made of any known light-transmissive adhesive that is capable of bonding the optical guide 28 and the filter 74 without interfering with the admission of the stimulated emission into the photo multiplier 32.

Figure 10:
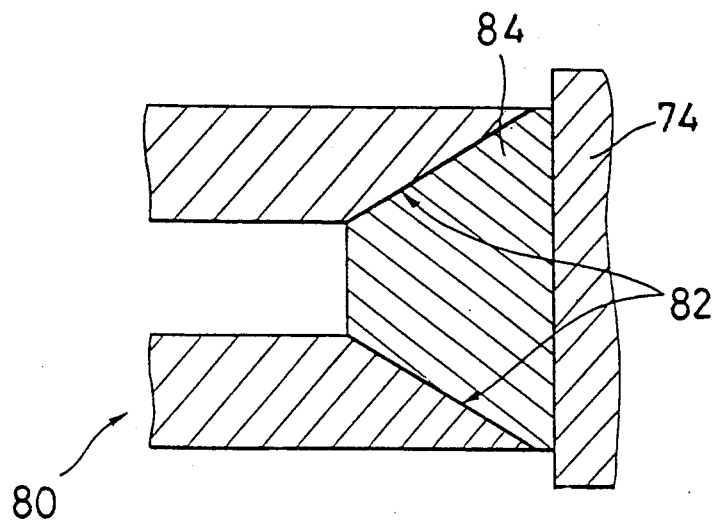
FIG. 10 is a schematic cross-sectional view that shows a preferred example of the exit face of the optical guide to be used in the fourth aspect of the present invention.
Figure 11:
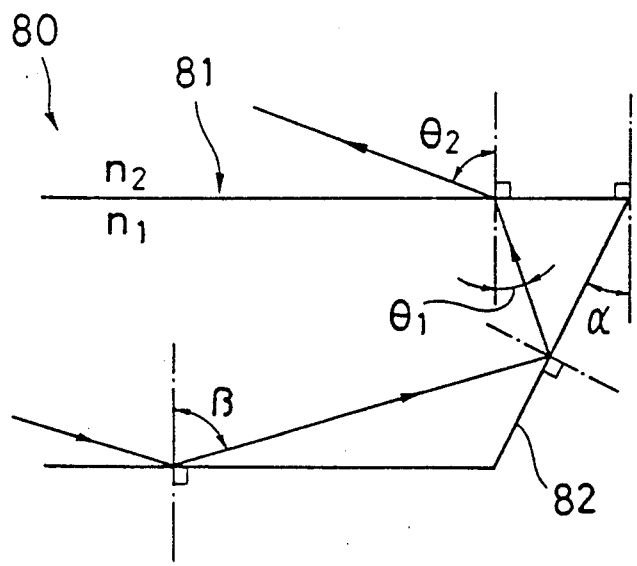
FIG. 11 is a partial enlarged view showing how light travels through the optical guide shown in FIG. 10.

FIG. 10 is a cross-sectional view showing schematically in part an advantageous example of the exit face 82 of the optical guide 80 taken in the sub-scanning direction (indicated by arrow b) according to the second preferred embodiment of the fourth aspect of the invention, and FIG. 11 is a partial enlarged view of the foremost end of the exit face 82. As in the case of the optical guide 28 used in the first preferred embodiment, the optical guide 80 is also fabricated by heating or otherwise processing a sheet of light-transmissive resin.

In the second preferred embodiment of the fourth aspect of the invention under consideration, the edge of the exit face 82 of the optical guide 80 is shaped like a wedge as shown in FIG. 10 and it is bonded to the filter 74 by means of an adhesive layer 84. The advantage of shaping the exit face 82 of the optical guide 80 like a wedge is described below with particular reference to FIG. 11. Even if flare is reflected at the interface between the exit face 82 and the adhesive layer (not shown), the reflected flare will not satisfy the critical condition for the total reflection of the flare travelling through the optical guide 80. As a result, the flare propagating towards the entrance face 26 will leak through the side wall 81 of the optical guide 80 and will not emerge from the entrance face 26 to make a second entry into the phosphor sheet A.

Consider, for example, the case where the exit face 82 of the optical guide 80 is inclined ar angle $\alpha$ as shown in FIG. 11. If flare is launched into the optical guide 80 at angle $\beta$ and if the propagating flare is reflected by the exit face 82 to be incident on the side wall 81 of the optical guide 80, then the angle of incidence $\theta_1$ on the side wall is expressed by the following equation:

$$\theta_1 = \beta - 2\alpha$$

On the other hand, the critical angle ($\theta$) beyond which the light incident on the side wall 81 will be totally reflected should satisfy the following condition:

$$-\theta_0 < \theta < \theta_0$$

where $\theta_0 = \sin^{-1}(n_2/n_1)$ where $n_1$ is the refractive index of the material of which the optical guide 80 is made, and $n_2$ is the refractive index of the medium surrounding the optical guide 80.

Therefore, in order to insure that the light reflected from the exit face 82 of the optical guide 80 will leak out of the side wall 81, the following condition should be satisfied:

$$-\theta_0 < \beta - 2\alpha < \theta_0 \tag{1}$$

Suppose here that light is launched into the optical guide 80 and propagates through it by repeated total reflection. The angle of incidence $\beta$ of such light would have the profile depicted in FIG. 12. In order to insure that the light reflected from the exit face 82 of the optical guide 80 and that is within the hatched area of FIG. 12 will emerge from the side wall 81, the angle of inclination $\alpha$ of the exit face 82 should satisfy the following conditions with relation (1) being taken into account:

$$\text{if } \beta = \theta_0, \ 0 < \alpha < \theta_0 \tag{2}$$

$$\text{if } \beta = \pi/2, \ (\pi/2 - \theta_0)/2 < \alpha < (\pi/2 + \theta_0)/2 \tag{3}$$

Figure 12:
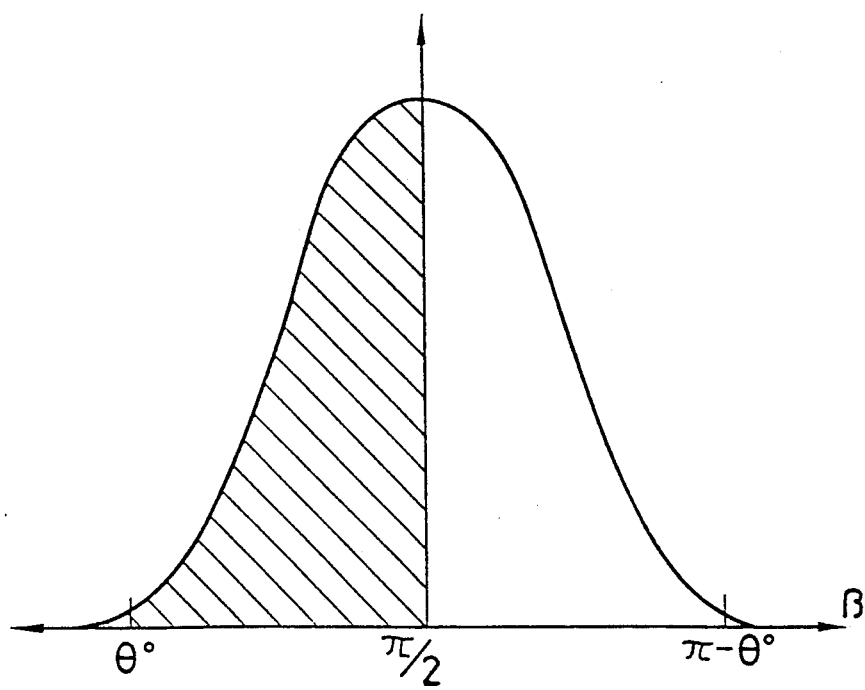
FIG. 12 is a graph showing a distribution of the incident angle of light that is launched into the optical guide.

In order that the light reflected from the exit face 82 and that is within the hatched area of FIG. 12 ($\theta_0 < \beta < \pi/2$) will not satisfy the critical condition for total reflection and in order to insure that all of such light will emerge from the side wall 81, both of the conditions (2) and (3) must be satisfied and the angle of inclination $\alpha$ of the exit face 82 in that case is expressed by the following relation:

$$(\pi/2 - \theta_0)/2 < \alpha < \theta_0 \tag{4}$$

Therefore, if the optical guide 80 has a refractive index ($n_1$) of 1.492, relation (4) dictates that the angle of inclination $\alpha$ of the exit face 82 need be in the range of 24°–42° in order to insure that a major portion of the flare reflected from the exit face 82 will emerge from the side wall 81 of the optical guide 80 so that it will not make a second entry into the phosphor sheet A to produce undesirable stimulated emission. As the angle $\alpha$ approaches 42°, the flare that is launched into the optical guide 80 ar angle $\beta$ which is outside the hatched area of FIG. 12 has a greater tendency to leak out of the side wall 81 in the same way as described above even if said flare is reflected from the exit face 82.

In the second preferred embodiment of the fourth aspect under discussion, the angle of inclination $\alpha$ of the exit face 82 is not limited to any particular value and may be determined in accordance with the refractive index of the optical guide 80 on the condition that the flare reflected from that exit face will not make a second entry into the phosphor sheet A. If the optical guide 80 has a refractive index (n) of 1.492, satisfactory results will be attained by adjusting $\alpha$ to lie within the range of 24°–42° as already described above.

Figure 13:
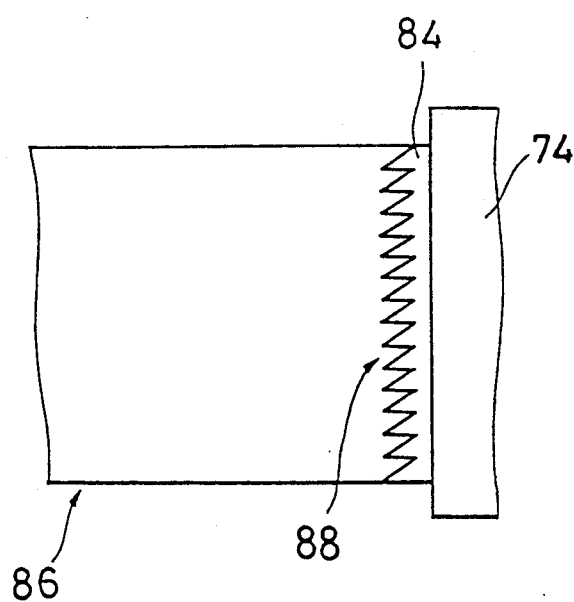
FIG. 13 is a schematic side view that shows another preferred example of the exit face of the optical guide to be used in the fourth aspect of the present invention.

In the example shown in FIG. 10, the edge of the resin sheet of which the optical guide 80 is formed is shaped like a wedge at the end face that corresponds to the exit face 82, thereby forming the wedge-shaped exit face 82. This is not the sole case of the present invention and various modifications may be made. An example of such modifications is depicted in FIG. 13, in which the exit face 88 of the optical guide 86 is shaped like a series of wedges and connected to the filter 74 via an adhesive layer 84.

Figure 14:
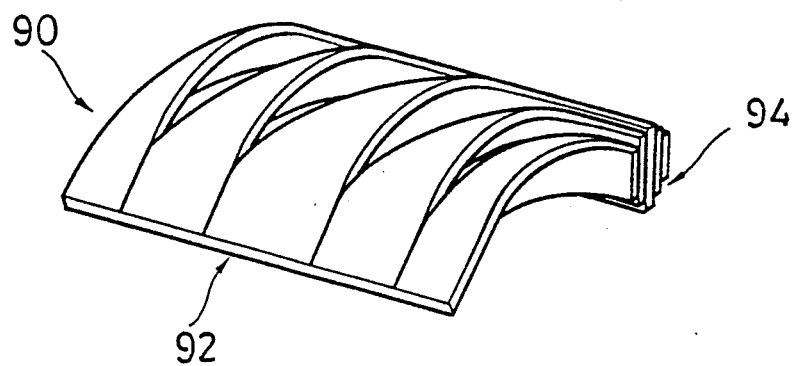
FIG. 14 is a schematic perspective view showing another preferred example of the optical guide to be used in the fourth aspect of the present invention.

The above-described first and second preferred embodiments of the fourth aspect of the present invention refer to the case of using an optical guide of the type disclosed in Japanese Patent Application Kokai No. 55-87970 but this is not the sole case of the present invention and its concept is also applicable advantageously to the optical guide that is disclosed in commonly assigned Japanese Patent Application Kokai No. 63-236025 and that is indicated by 90 in accompanying FIG. 14. The optical guide 90 is fabricated by the following method: a sheet of conductive material is partially cut into an array of strips in a direction perpendicular to the edge that corresponds to the entrance face 92 and then the individual strips are bent in a direction parallel to said edge and bundled together at the other end in such a way that they are stacked in the direction of the thickness of the conductive sheet to make the exit face 94.

Figure 15:
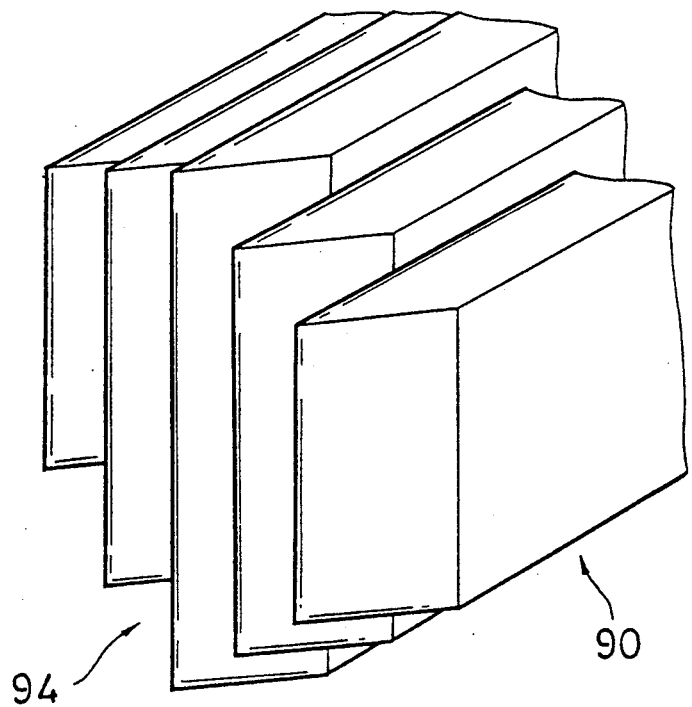
FIG. 15 is a schematic perspective view of the exit face of the optical guide shown in FIG. 14.

When the thus fabricated optical guide 90 is to be applied to the second preferred embodiment of the fourth aspect of the present invention, the exit face 94 may comprise a series of wedge-shaped end faces of the strips of conductive material as shown in FIG. 15. Alternatively, each strip may have a series of wedges formed in its end face as shown in FIG. 13.

Having the construction described above, the reading apparatus 10 according to the first preferred embodiment of the fourth aspect of the present invention eliminates the possibility that the flare admitted into the optical guide is reflected at the interface between the adhesive layer and the exit face of the optical guide or the filter to make a second entry into the phosphor sheet A. The advantage of the second preferred embodiment of this fourth aspect is that even if the flare is reflected at those interfaces, the angle of reflection does not satisfy the critical condition for total reflection, causing the flare to leak out of the optical guide without making a second entry into the phosphor sheet A. If desired, the first and the second preferred embodiments may be combined.

In another preferred embodiment, the reflecting face 36 of the cylindrical condenser mirror 30 may be provided with a dichroic coat 37 which transmits and absorbs the excitation light but which reflects the stimulated emission. With this arrangement, not only the flare admitted into the optical guide but also the flare reflected from the cylindrical condenser mirror 30 can be effectively prevented from making a second entrance into the phosphor sheet A. As a result, correct radiation image information can be read with the adverse effects of those flares being reduced to a minimum level.

As in the reading apparatus according to the first aspect of the present invention, the apparatus according to the fourth aspect may be so designed that a filter medium that is at least capable of absorbing the excitation light is provided on the back side of the dichroic coat 37 on the reflecting face 36 of the cylindrical condenser mirror 30, namely, the body material of the mirror 36 or the adhesive layer between the body material and the mirror support member may be formed of a filter medium of that nature. With this arrangement, the flare incident on the cylindrical condenser mirror 30 can be effectively absorbed without reflection, thereby reducing the secondary flare that would otherwise result from that flare.

Further, as in the second aspect of the present invention the reading apparatus according to the fourth aspect may be so modified that a slit plate is provided between the light collecting unit and the scanning optical unit in order to reduce the secondary flare that would otherwise result from the flare travelling back in a direction opposite to the excitation light L.

Furthermore, as in the third embodiment of the present invention, a flexible light-shielding member such as a light-shielding screen may be suspended from the cylindrical condenser mirror 30 or the optical guide 28 in the reading apparatus according to the fourth aspect so as to reduce the flare that would otherwise be incident on the phosphor sheet A in areas close to the main scanning line 18.

The stimulated emission and the excitation light that are launched into the optical guide 28 at its entrance face 26 propagates upward through the optical guide 28 by repeating total reflection until it is admitted into the color filter 74, which transmits the stimulated emission unattenuated but which cuts off the excitation light. In the first preferred embodiment of the fourth aspect of the present invention, even the excitation light that was launched into the optical guide 28 either directly or as flare will not be reflected at the exit face of the optical guide (more precisely, at the interface between the exit face and the adjacent adhesive layer) or at the entrance face of the color filter 74 (more precisely, at the interface between the adhesive layer and the entrance face). The second preferred embodiment has the additional advantage that even if part of such excitation light is reflected at those interfaces, it will not be admitted again into the phosphor sheet A. As the consequence, the stimulated emission that has passed through the color filter 74 will be launched into the photo multiplier 32 where it is read photoelectrically.

The thus read stimulated emission is substantially free not only from flare but also from the stimulated emission caused by that flare and, hence, the electric image information signal obtained by processing that emission is an image signal of good quality which has high contrast but low noise.

As described in detail on the foregoing pages, the apparatus for reading radiation image information according to the first preferred embodiment of the fourth aspect of the present invention has the advantage that the flare admitted into the optical guide will not be reflected at the interface between its exit face or the excitation light-absorbing filter and the adhesive layer for bonding these two members. Instead, the flare will positively pass through the adhesive layer to be admitted into the filter where it is sufficiently absorbed to make no second entry into the stimulable phosphor sheet.

The reading apparatus according to the second preferred embodiment of the fourth aspect of the present invention has the additional advantage that even if the flare admitted into the optical guide makes reflections at the interface between the adhesive layer and the exit face of the optical guide or the filter, the angle of reflection does not satisfy the critical condition for total reflection and hence the flare will not make reentry into the stimulable phosphor sheet as in the first preferred embodiment.

Thus, according to the apparatus of the fourth aspect of the present invention, correct radiation image information can be read without involving any lower contrast or increased noise due to flare.

While the apparatus of the present invention for reading radiation image information has been described above in detail with reference to its four aspects, it should be noted that the present invention is in no way limited to those particular aspects and that various design modifications and improvements can be made without departing from the spirit and scope of the invention. For instance, two or more of these four aspects may be combined as appropriate for a specific need.

What is claimed is:

1. An apparatus for reading radiation image information comprising:
   a scanning optical unit for scanning excitation light over its surface of a stimulable phosphor sheet having radiation image information stored and recorded therein:
   an optical guide having an entrance face that is located in the vicinity of a main scanning line of said excitation light and that faces said scanning line, said optical guide receiving and transmitting the stimulated emission that is produced from said stimulable phosphor sheet in response to the scanning of said excitation light;

a condenser mirror that is located in the vicinity of the main scanning line of said excitation light and that faces said scanning line, said condenser mirror reflecting the stimulated emission to be incident on the entrance face of said optical guide; and a photodetector with which the stimulated emission transmitted through said optical guide is read photoelectrically, the reflecting face of said condenser mirror being formed of a coating that reflects said stimulated emission but which transmits said excitation light, said coating being provided on its back side with a filter medium that is at least capable of absorbing said excitation light.

2. An apparatus according to claim 1 wherein said filter capable of absorbing the excitation light is a color filter or a light-absorbing filter.

3. An apparatus according to claim 1 wherein said filter capable of absorbing the excitation light is either the body material of said condenser mirror or a filter that is provided between said condenser mirror and its support member.

4. An apparatus for radiation image formation comprising:

a scanning optical unit for scanning excitation light over its surface of a stimulable phosphor sheet having radiation image information stored and recorded therein;

an optical guide having an entrance face that is located in the vicinity of a main scanning line of said excitation light and that faces said scanning line, said optical guide receiving and transmitting the stimulated emission that is produced from said stimulable phosphor sheet in response to the scanning of said excitation light;

a condenser mirror that is located in the vicinity of the main scanning line of said excitation light and that faces said scanning line, said condenser mirror reflecting the stimulated emission to be incident on the entrance face of said optical guide;

a photodetector with which the stimulated e ission transmitted through said optical guide is read photoelectrically; and means for preventing excitation light reflected off said phosphor sheet from entering said entrance face of said optical guide, said preventing means including a slit plate that has a slit through which to pass excitation light and that is located between said scanning optical unit and the light collecting unit composed of said optical guide and said condenser mirror in such a way as to cover the gap between the entrance face of said optical guide and the reflecting face of said condenser mirror.

5. An apparatus according to claim 4 wherein said slit plate is inclined at a predetermined angle so that the light scattered from said stimulable phosphor sheet is reflected toward areas other than said gap.

6. An apparatus according to claim 5 wherein said slit plate is formed of a material that absorbs the excitation light.

7. An apparatus according to claim 6 wherein said material that absorbs the excitation light is an acrylonitrile-styrene-butadiene (ABS) resin.

8. An apparatus according to claim 5 wherein the surface of said slit plate on the side which faces said stimulable phosphor sheet is smooth enough to prevent the scattering of said excitation light.

9. An apparatus according to claim 8 wherein a filter medium that is at least capable of absorbing the excitation light is provided on the back side of said material of which the reflecting face of said condenser mirror is formed.

10. An apparatus according to claim 4 wherein said slit plate has a non-reflective coating on the side which faces said stimulable phosphor sheet.

11. An apparatus according to claim 10 wherein said slit plate is formed of a material that absorbs the excitation light.

12. An apparatus according to claim 4 wherein the reflecting face of said condenser mirror is formed of a material that reflects the stimulated emission and that transmits at least the excitation light.

13. An apparatus for reading radiation image information comprising:

a scanning optical unit for scanning excitation light over its surface of a stimulable phosphor sheet having radiation image information stored and recorded therein;

an optical guide having an entrance face that is located in the vicinity of a main scanning line of said excitation light and that faces said scanning line, said optical guide receiving and transmitting the stimulated emission that is produced from said stimulable phosphor sheet in response to the scanning of said excitation light;

a condenser mirror that is located in the vicinity of the main scanning line and that faces said scanning line, said condenser mirror reflecting the stimulated emission to be incident on the entrance face of said optical guide;

a photodetector with which the stimulated emission transmitted through said optical guide is read photoelectrically;

a means for transporting said stimulable phosphor sheet in a sub-scanning direction which is generally perpendicular to a main scanning direction of said excitation light; and a flexible light-shielding member that is suspended upstream of said main scanning line in the sub-scanning direction in which said stimulable phosphor sheet is transported.

14. An apparatus according to claim 13 wherein said light-shielding member is composed in such a way that its free end is positioned in the vicinity of the main scanning line of excitation light when the stimulable phosphor sheet is transported in the sub-scanning direction for reading radiation image information.

15. An apparatus according to claim 13 wherein said light-shielding member is suspended from said condenser mirror.

16. An apparatus according to claim 13 wherein said light-shielding member is suspended from said optical guide.

17. An apparatus for reading radiation image information comprising;

a scanning optical unit for scanning excitation light over its surface of a stimulable phosphor sheet having radiation image information stored and recorded therein;

an optical guide having an entrance face that is located in the vicinity of a main scanning line of said excitation light and that faces said scanning line, said optical guide receiving and transmitting the stimulated emission that is produced from said stimulable phosphor sheet in response to the scanning of said excitation light;

a condenser mirror that is located in the vicinity of the main scanning line of said excitation light and that faces said scanning line, said condenser mirror reflecting the stimulated emission to be incident on the entrance face of said optical guide;

a photodetector with which the stimulated emission transmitted through said optical guide is read photoelectrically;

a filter that absorbs said excitation light and that is provided between the exit face of said optical guide and said photodetector; and an adhesive layer that bonds said filter to the exit face of said optical guide the refractive index difference between said adhesive layer and each of said optical guide and said filter being no more than 0.05.

18. An apparatus for reading radiation image information comprising:

a scanning optical unit for scanning excitation light over its surface of a stimulable phosphor sheet having radiation image information stored and recorded therein:

an optical guide having a wedge-shaped exit face portion having a vertex and an entrance face that is located in the vicinity of a main scanning line of said excitation light and that faces said scanning line, said optical guide receiving and transmitting the stimulated emission that is produced from said stimulable phosphor sheet in response to the scanning of said excitation light;

a condenser mirror that is located in the vicinity of the main scanning line of said excitation light and that faces said scanning line, said condenser mirror reflecting the stimulated emission to be incident on the entrance face of said optical guide; and a photodetector with which the stimulated emission transmitted through said optical guide is read photoelectrically.

* * * * *